(12) United States Patent
Kim (10) Patent No.: US 9,470,783 B2
(45) Date of Patent: Oct. 18, 2016

(54) APPARATUS AND METHOD FOR OBTAINING RADAR SIGNAL

(71) Applicant: Electronics and Telecommunications Research Institute, Daejeon (KR)

(72) Inventor: Dong Kyoo Kim, Chungcheongnam-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 326 days.

(21) Appl. No.: 14/156,244

(22) Filed: Jan. 15, 2014

(65) Prior Publication Data

US 2015/0355320 A1    Dec. 10, 2015

(30) Foreign Application Priority Data

Jan. 24, 2013    (KR) ........................ 10-2013-0007797

(51) Int. Cl.
*G01S 13/02* (2006.01)
*G01S 13/88* (2006.01)

(52) U.S. Cl.
CPC .......... *G01S 13/0209* (2013.01); *G01S 13/885* (2013.01)

(58) Field of Classification Search
CPC .................................................... G01S 13/0209
USPC .......................................................... 342/21
See application file for complete search history.

(56) References Cited

U.S. PATENT DOCUMENTS

| | | | | |
|---|---|---|---|---|
| 4,041,489 A | * | 8/1977 | Lewis | G01S 13/106 342/159 |
| 2005/0058218 A1 | * | 3/2005 | Jenkins | H04B 1/69 375/295 |
| 2009/0034647 A1 | * | 2/2009 | Shirakata | H04L 69/28 375/285 |
| 2011/0279305 A1 | | 11/2011 | Lellouch et al. | |
| 2012/0032855 A1 | * | 2/2012 | Reede | G01S 5/0289 342/458 |
| 2012/0200446 A1 | * | 8/2012 | Shirakawa | G01S 13/90 342/27 |

* cited by examiner

*Primary Examiner* — Timothy A Brainard
(74) *Attorney, Agent, or Firm* — Rabin & Berdo, P.C.

(57) ABSTRACT

Provided is an apparatus and method for obtaining a radar signal, the apparatus including a radar transmitter to radiate a plurality of split band penetration signals toward a target object, and a radar receiver to receive a plurality of signals reflected from the target object, and to obtain a wideband response signal using the plurality of reflected signals.

9 Claims, 12 Drawing Sheets

APPARATUS AND METHOD FOR OBTAINING RADAR SIGNAL

CROSS-REFERENCE TO RELATED APPLICATION

This application claims the priority benefit of Korean Patent Application No. 10-2013-0007797, filed on Jan. 24, 2013, in the Korean Intellectual Property Office, the disclosure of which is incorporated herein by reference.

BACKGROUND

1. Field of the Invention

Embodiments of the present invention relate to a technology of radiating a plurality of orthogonal frequency division multiplexing (OFDM) based split band penetration signals toward a target object, and quickly obtaining a wideband response signal using a plurality of signals reflected from the target object.

2. Description of the Related Art

A ground penetrating radar apparatus may perform a technology of projecting a radio frequency (RF) penetration signal onto a target object, receiving a signal reflected from the target object, and thereby sensing an inside state of the target object as one of nondestructive inspection methods.

The conventional ground penetration radar apparatus may obtain a reflected signal using, for example, an impulse method and a step frequency method.

Here, the impulse method refers to a method of employing, as a projection signal, a signal having great energy during a relatively short period of time, that is, an impulse signal. An impulse signal to be projected has a wideband frequency characteristic. Here, high resolution sensing for inside of the target object may be further readily performed according to an increase in a bandwidth of a frequency. Also, the impulse method may project wideband signals at a time in an instant and thus, may quickly perform a sensing operation.

Also, the step frequency method refers to a method of sensing the inside of the target object by projecting a penetration signal several times through frequency modulation of, for example, a sine wave and thereby achieving the same effect as an effect achieved in the case of radiating a wideband signal. The step frequency method generates a wideband signal by dividing a modulation frequency of a sign wave into steps over time and thereby performing up-converting or down-converting, which is different from the impulse method of projecting wideband signals at a time in an instance. Therefore, a relatively large amount of time is used to generate a single wide band signal and thus, the step-frequency method may perform a sensing operation significantly slowly compared to the impulse method.

In the case of the impulse method, fast sensing may be performed, but a generated signal may have a poor frequency band characteristic. Further, generating high power impulse may be difficult. Accordingly, the impulse method is barely used to obtain a high resolution penetration signal.

In the case of the step frequency method, a generated signal may have an excellent frequency band characteristic and a signal may be generated with high power. Accordingly, the step frequency method may be advantageous in obtaining a high resolution penetration signal. However, as described above, the step frequency method may perform only slow sensing and thus, are restricted on a utilization and application field thereof.

A ground penetration radar technology may also be widely employed to verify a state of road traffic facilities, for example, to diagnose inside cracks of roads, to perform new routing, to measure the thickness of road pavement, and the like. Here, considering that an inside sensing depth of road traffic facilities needs to about 1 to 2 meters and sensing resolution needs to be within about 3 cm, the step frequency method among ground penetration radar technologies may be suitable.

However, in the case of performing a task using a ground penetration radar apparatus of a step frequency method, only slow sensing is possible and thus, an amount of work time may increase with the road traffic being controlled, thereby obstructing the traffic.

SUMMARY

An aspect of the present invention provides a method and apparatus that may radiate a plurality of orthogonal frequency division multiplexing (OFDM) based split band penetration signals toward a target object, and quickly obtain a wideband response signal using a plurality of signals reflected from the target object.

According to an aspect of the present invention, there is provided an apparatus for obtaining a radar signal, the apparatus including: a radar transmitter to radiate a plurality of split band penetration signals toward a target object; and a radar receiver to receive a plurality of signals reflected from the target object, and to obtain a wideband response signal using the plurality of reflected signals.

According to another aspect of the present invention, there is provided a method of obtaining a radar signal, the method including: radiating a plurality of split band penetration signals toward a target object; and receiving a plurality of signals reflected from the target object, and obtaining a wideband response signal using the plurality of reflected signals.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an apparatus and method for obtaining a radar signal according to an embodiment of the present invention will be described with reference to the accompanying drawings.

Figure 1:
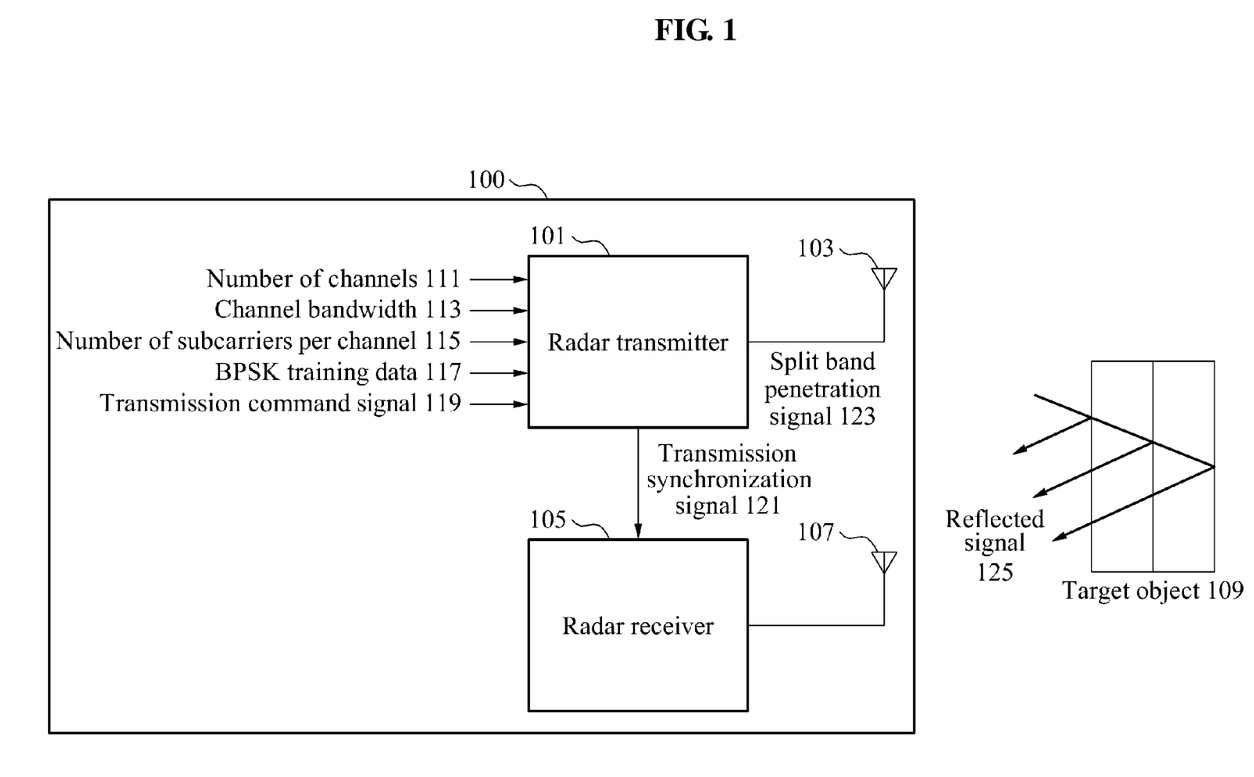
FIG. 1 is a diagram illustrating a radar signal obtainment apparatus according to an embodiment of the present invention.

FIG. 1 is a diagram illustrating a radar signal obtainment apparatus 100 according to an embodiment of the present invention.

Referring to FIG. 1, the radar signal obtainment apparatus 100 may include a radar transmitter 101 and a radar receiver 105.

The radar transmitter 101 may receive setting information, may generate orthogonal frequency division multiplexing (OFDM) based split band penetration signals 123 based on the received setting information, and may radiate the generated split band penetration signals 123 toward a target object 109 via a transmit antenna 103. Here, the radar transmitter 101 may set a channel, for example, channel 1, 2, 3, . . . , M, to each of the plurality of baseband split band penetration signals 123, may convert a band of each of the plurality of split band penetration signals 123 to a different pass band corresponding to the set channel, and may radiate each of the plurality of split band penetration signals 123. Here, the radar transmitter 101 may convert the band of each of the plurality of split band penetration signals 123 to the pass band by up-converting the band of each of the plurality of split band penetration signals 123 by a carrier frequency corresponding to the set channel.

Here, the setting information may include at least one of the number of channels 111, for example, the number of channels corresponding to the plurality of split band penetration signals 123, a channel bandwidth 113 of each of the plurality of split band penetration signals 123, the number of subcarrier per channel 115, for example, the number of subcarriers present within a single channel, binary phase-shift keying (BPSK) training data 117, and a transmission command signal 119, for example, a signal instructing the radar transmitter 101 to transmit the split band penetration signal 123.

The radar transmitter 101 may output, to the radar receiver 105, a transmission synchronization signal 121 that is a signal for synchronization between the radar transmitter 101 and the radar receiver 105.

The radar receiver 105 may receive an OFDM based signal 125 reflected from the target object 109 through a receive antenna 107, and may generate a wideband response signal. Here, the radar receiver 105 may be synchronized with the radar transmitter 101 using the transmission synchronization signal 121 output from the radar transmitter 101.

For example, the radar receiver 105 may convert a band of each of the plurality of reflected signals 125 to a baseband, may estimate a channel of the converted band of each of the plurality of reflected signals, and may obtain a channel estimate value corresponding to the estimated channel. When all of channel estimate values associated with the respective reflected signals 125 are obtained, the radar receiver 105 may obtain the wideband response signal based on the obtained channel estimate values.

Figure 2:
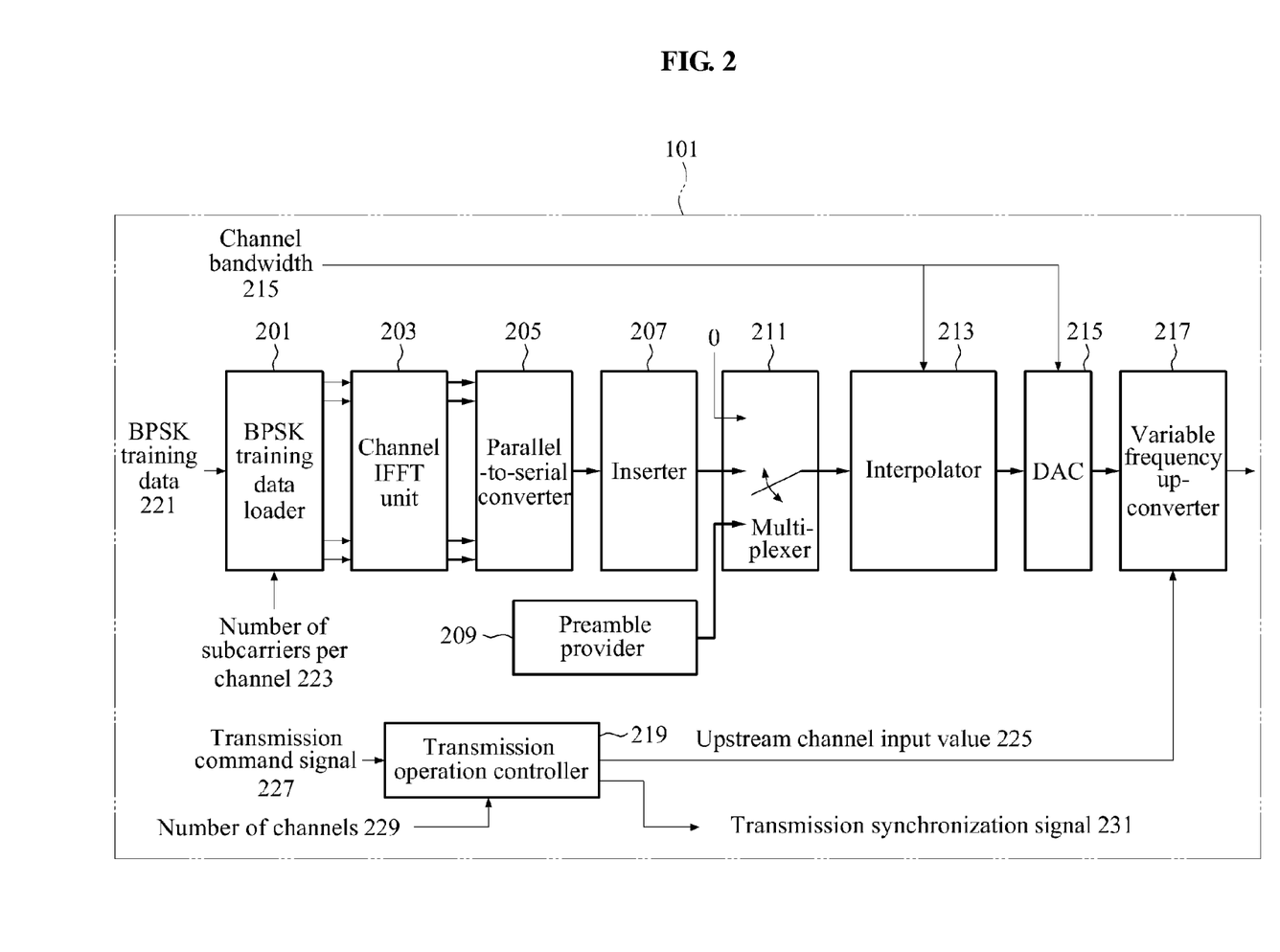
FIG. 2 is a diagram illustrating a configuration of a radar transmitter included in a radar signal obtainment apparatus according to an embodiment of the present invention.

FIG. 2 is a diagram illustrating a configuration of a radar transmitter 101 included in an radar signal obtainment apparatus according to an embodiment of the present invention.

Referring to FIG. 2, the radar transmitter 101 may include a BPSK training data loader 201, a channel inverse fast Fourier transformation (IFFT) unit 203, a parallel-to-serial converter 205, an inserter 207, a preamble provider 209, a multiplexer 211, an interpolator 213, a digital-to-analog converter (DAC) 215, a variable frequency up-converter 217, and a transmission operation controller 219.

The BPSK training data loader 201 may receive BPSK training data 221, and may align the BPSK training data 221 in parallel to correspond to the number of subcarriers per channel 223.

The channel IFFT unit 203 may receive the number of subcarriers per channel 223 and may perform IFFT the number of times corresponding to the number of subcarriers per channel 223.

The parallel-to-serial converter 205 may align a result of the channel IFFT unit 203 in series.

The inserter 207 may insert a cyclic prefix into a result of the parallel-to-serial converter 205.

The preamble provider 209 may generate and provide a preamble.

The multiplexer 211 may select and then output one of an output of the inserter 207, a real number, for example, "0", and an output of the preamble provider 209.

The interpolator 213 may perform oversampling by interpolating the output of the multiplexer 211.

The DAC 215 may convert an oversampled signal to an analog signal.

The variable frequency up-converter 217 may convert a baseband analog signal converted by the DAC 215 to a pass band analog signal by up-converting a frequency of the baseband analog signal based on an upstream channel input value 225, for example, a channel number corresponding to a signal desired to be frequency up-converted. The upstream channel input value 225 may be provided from the transmission operation controller 219. The variable frequency up-converter 217 may radiate the converted pass band analog signal toward a target object as a split band penetration signal.

When a transmission command signal 227 is input, the transmission operation controller 219 may repeatedly drive the BPSK training data loader 201, the channel IFFT unit 203, the parallel-to-serial converter 205, the inserter 207, the preamble provider 209, the multiplexer 211, the interpolator 213, the DAC 215, and the variable frequency up-converter 217 the number of times corresponding to the number of input channels 229. Here, the transmission operation controller 219 may provide the upstream channel input value 225 of each channel to the variable frequency up-converter 217.

Also, the transmission operation controller 219 may generate a transmission synchronization signal 231 and may output the generated transmission synchronization signal 231 to a radar receiver so that an operation of the radar receiver may be synchronized with the radar transmitter 101.

Figure 3:
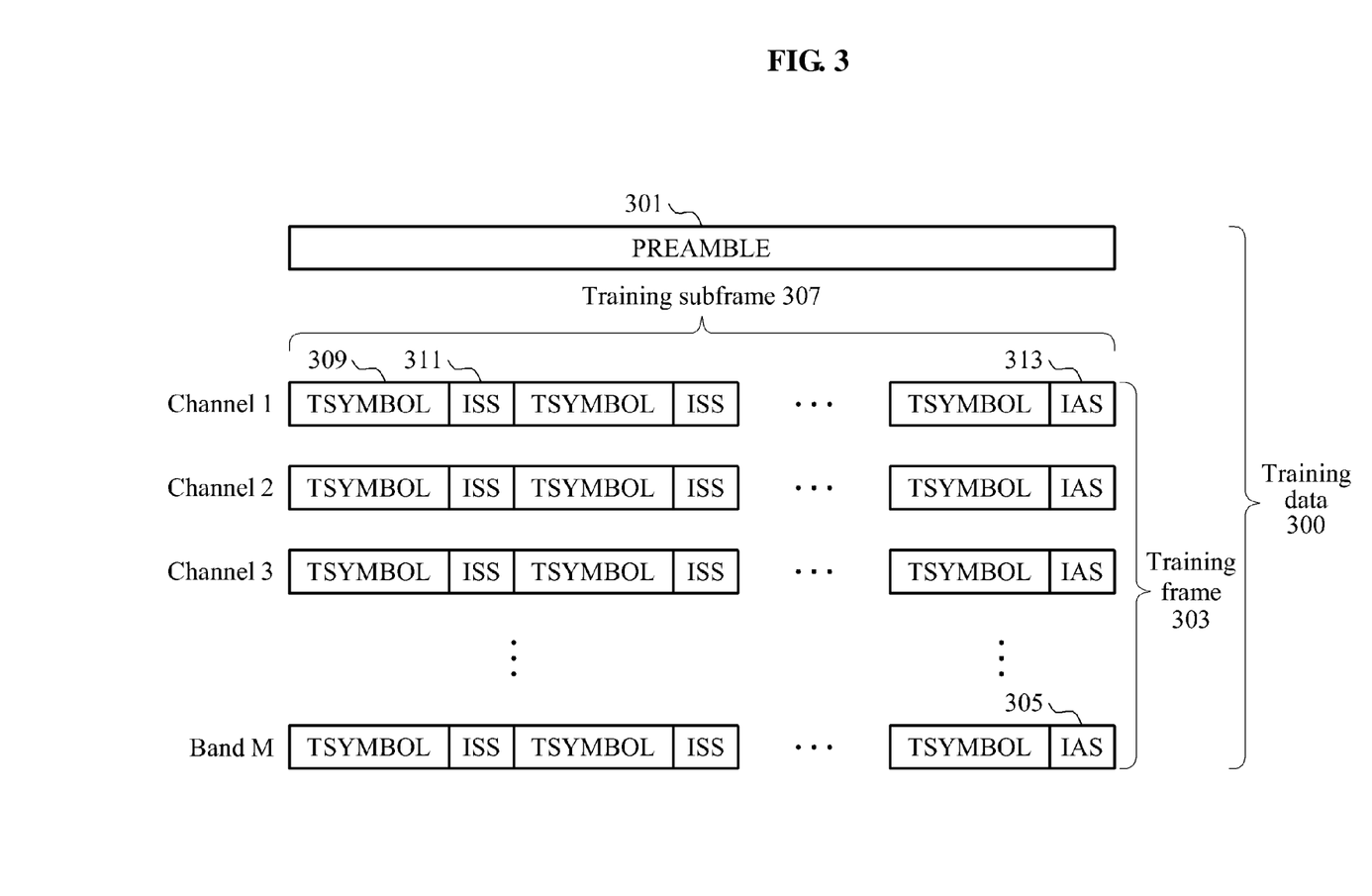
FIG. 3 is a diagram illustrating a format of training data output from a multiplexer included in a radar transmitter.

FIG. 3 is a diagram illustrating a format of training data 300 output from a multiplexer included in a radar transmitter.

Referring to FIG. 3, the training data 300 may include a preamble 301 and a training frame 303. The training data 300 may further include an inter antenna spacing (IAS) 305 that is a time interval between adjacent training frames 303.

The preamble 301 may refer to a signal that enables the radar receiver to detect a signal reflected from a target object.

The training frame 303 may include a plurality of training subframes 307 corresponding to all of a plurality of channels, for example, channels 1, 2, 3, . . . , M.

The training subframe 307 may include a plurality of training symbols (TSYMBOLs) 309 and a plurality of inter symbol spacings (ISSs) 311. Here, the TSYMBOL 309 may be an OFDM symbol having a cyclic prefix generated through a BPSK training data loader, a channel IFFT unit, a parallel-to-serial converter, and an inserter. The ISS 311 may refer to a time interval between the adjacent TSYMBOLs 309.

The training frame 303 may further include an inter frame spacing (IFS) 313 that is a time interval between adjacent training subframes 307.

Figure 4:
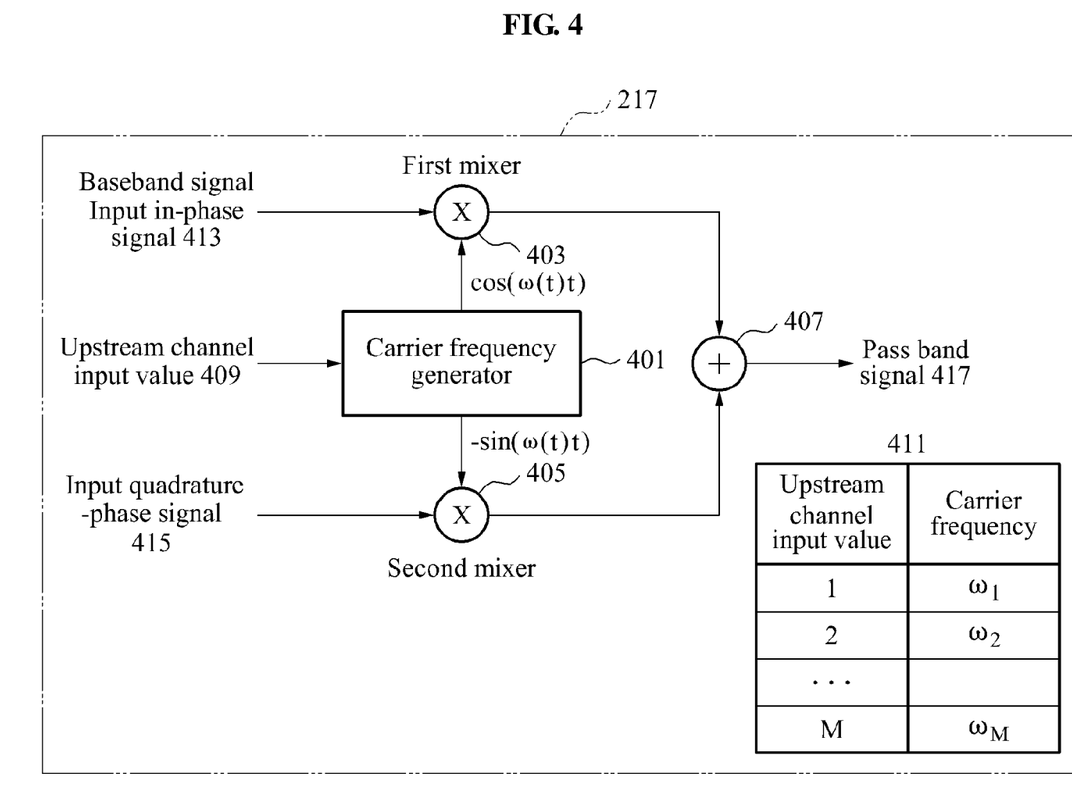
FIG. 4 is a diagram illustrating a configuration of a variable frequency up-converter included in a radar transmitter.

FIG. 4 is a diagram illustrating a configuration of a variable frequency up-converter 217 included in a radar transmitter.

Referring to FIG. 4, the variable frequency up-converter 217 may include a carrier frequency generator 401, a first mixer 403, a second mixer 405, and an operator 407.

The carrier frequency generator 401 may generate a carrier frequency based on an upstream channel input value 409, for example, 1, 2, 3, . . . , M. For example, referring to a mapping table 411, the carrier frequency generator 402 may generate a carrier frequency $\omega_1$ when the upstream channel input value 409 is "1", and may generate a carrier frequency $\omega_2$ when the upstream channel input value 409 is "2".

The first mixer 403 may mix, for example, an input in-phase signal 413 that is a baseband signal and a signal $(\cos(\omega(t)t))$ corresponding to the carrier frequency provided from the carrier frequency generator 401.

The second mixer 405 may mix, for example, an input quadrature-phase signal 415 that is a baseband signal and a signal $(-\sin(\omega(t)t))$ corresponding to the carrier frequency provided from the carrier frequency generator 401.

The operator 407 may output a pass band signal 417 having a carrier frequency by adding up an output of the first mixer 403 and an output of the second mixer 405.

Figure 5:
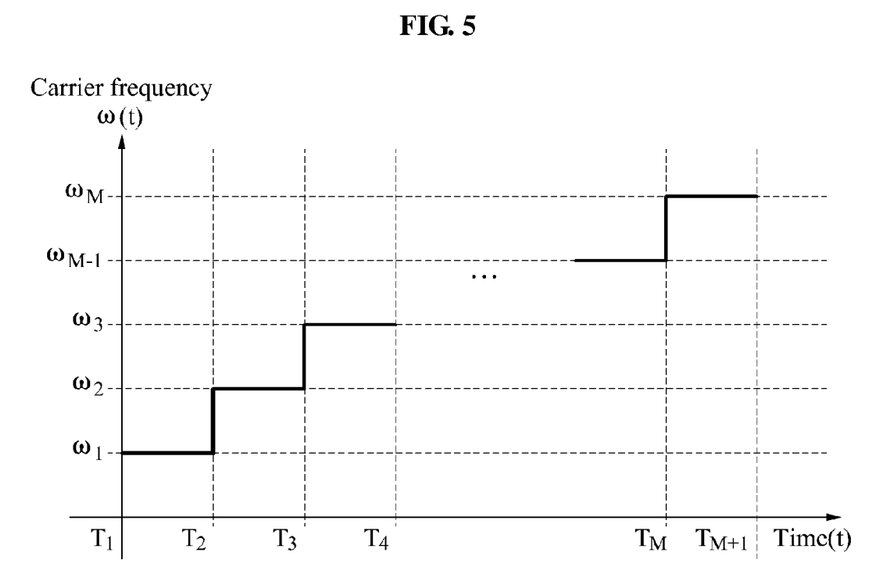
FIG. 5 is a graph illustrating a variable sequence of a carrier frequency.

FIG. 5 is a graph illustrating a variable sequence of a carrier frequency.

Referring to FIG. 5, the carrier frequency may discretely increase over time. For example, the carrier frequency $\omega_1$ may be maintained during $T_1$ to $T_2$, and the carrier frequency $\omega_2$ may be maintained during $T_2$ to $T_3$.

Figure 6:
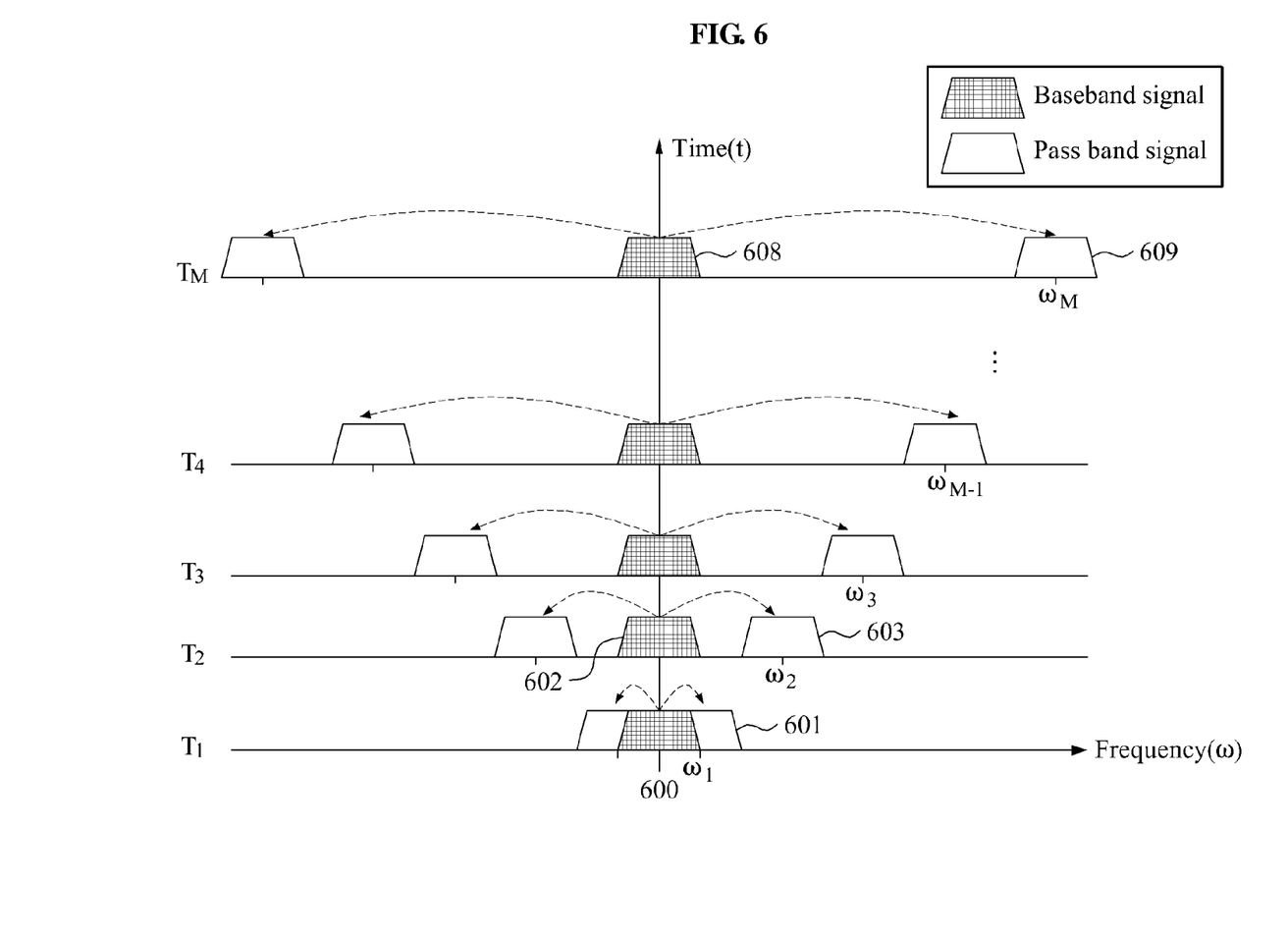
FIG. 6 illustrates an example of a radar transmitter radiating a split band penetration signal.

FIG. 6 illustrates an example of a radar transmitter radiating a split band penetration signal.

Referring to FIG. 6, the radar transmitter may generate, for example, a baseband channel signal 600, that is, a split band penetration signal, and may up-convert the generated baseband channel signal 600 to a pass band channel signal corresponding to a channel having a carrier frequency $\omega_1$ during a period of time from $T_1$ to $T_2$.

The radar transmitter may generate a baseband channel signal 602, and may up-convert the generated baseband channel signal 602 to a pass band channel signal 603 corresponding to a channel having a carrier frequency $\omega_2$ during a period of time from $T_2$ to $T_3$.

Also, the radar transmitter may generate a baseband channel signal 608, and may up-convert the generated baseband channel signal 608 to a pass band channel signal 609 corresponding to a channel having a carrier frequency $\omega_M$ during a period of time from $T_M$ to $T_{M+1}$.

Figure 7:
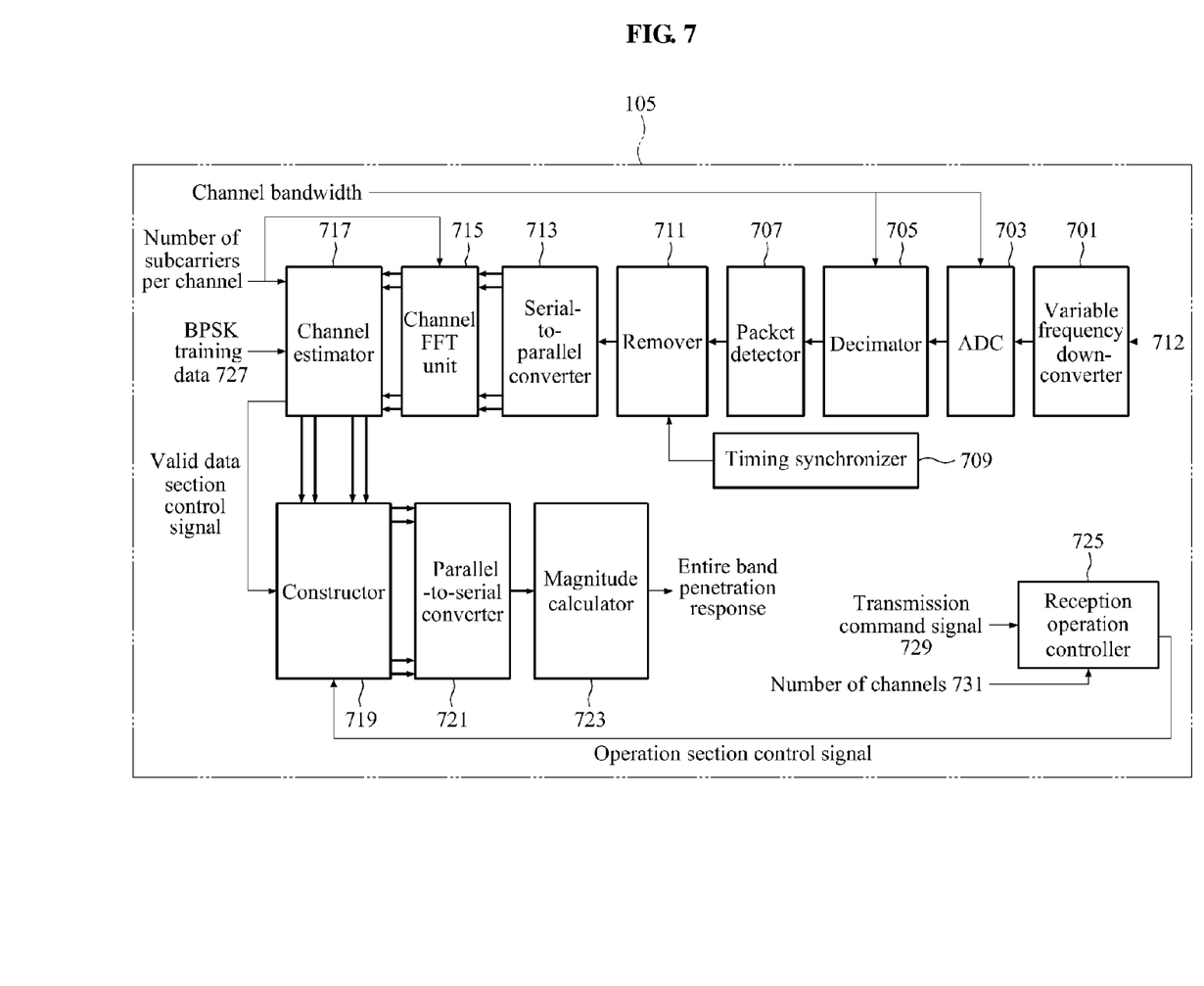
FIG. 7 is a diagram illustrating a configuration of a radar transmitter included in a radar signal obtainment apparatus according to an embodiment of the present invention.

FIG. 7 is a diagram illustrating a configuration of a radar transmitter 105 included in a radar signal obtainment apparatus according to an embodiment of the present invention.

Referring to FIG. 7, the radar receiver 105 may include a variable frequency down-converter 701, an analog-to-digital converter (ADC) 703, a decimator 705, a packet detector 707, a timing synchronizer 709, a remover 711, a serial-to-parallel converter 713, a channel fast Fourier transformation (FFT) unit 715, a channel estimator 717, a constructor 719, a parallel-to-serial converter 721, a magnitude calculator 723, and a reception operation controller 725.

The variable frequency down-converter 701 may convert, to a baseband signal, a pass band signal up-converted by a variable frequency up-converter included in a radar transmitter.

The ADC 703 may convert, to a digital signal, the baseband signal that is an analog signal. Here, the ADC 703 may determine a sampling frequency based on an input channel bandwidth, and may convert a pass band signal to the baseband signal based on the determined sampling frequency.

The decimator 705 may perform under-sampling of a signal oversampled by an interpolator included in the radar transmitter.

The packet detector 707 may detect a training frame by detecting a preamble signal from an output signal of the decimator 705.

The timing synchronizer 709 may detect a start position of a TSYMBOL from the detected training frame, and may provide the detected start position to the remover 711.

The remover 711 may remove a cyclic prefix inserted by an inserter included in the radar transmitter.

The serial-to-parallel converter 713 may assign a result of the remover 711 in parallel.

The channel FFT unit 715 may convert an output of the serial-to-parallel converter 713 to a frequency domain signal. That is, the channel FT unit 715 may convert, to the frequency domain signal, each TSYMBOL in which a cyclic prefix is removed.

The channel estimator 717 may estimate and thereby generate a frequency domain response signal of the baseband channel signal based on input BPSK training data 727 and an output of the channel FFT unit 715.

The constructor 719 may generate an integrated band time domain response signal using all of frequency domain response signals of base band signals for the respective channels.

The parallel-to-serial converter 721 may serialize an output of the constructor 719.

The magnitude calculator 723 may be an absolute value processor and may output a magnitude response signal of the integrated band time domain response signal.

When a transmission synchronization signal 729 is input, the reception operation controller 725 may repeatedly drive the variable frequency down-converter 701, the ADC 703, the decimator 705, the packet detector 707, the timing synchronizer 709, the remover 711, the serial-to-parallel converter 713, the channel FFT unit 715, and the channel estimator 717 the number of times corresponding to the number of input channels 731.

Figure 8:
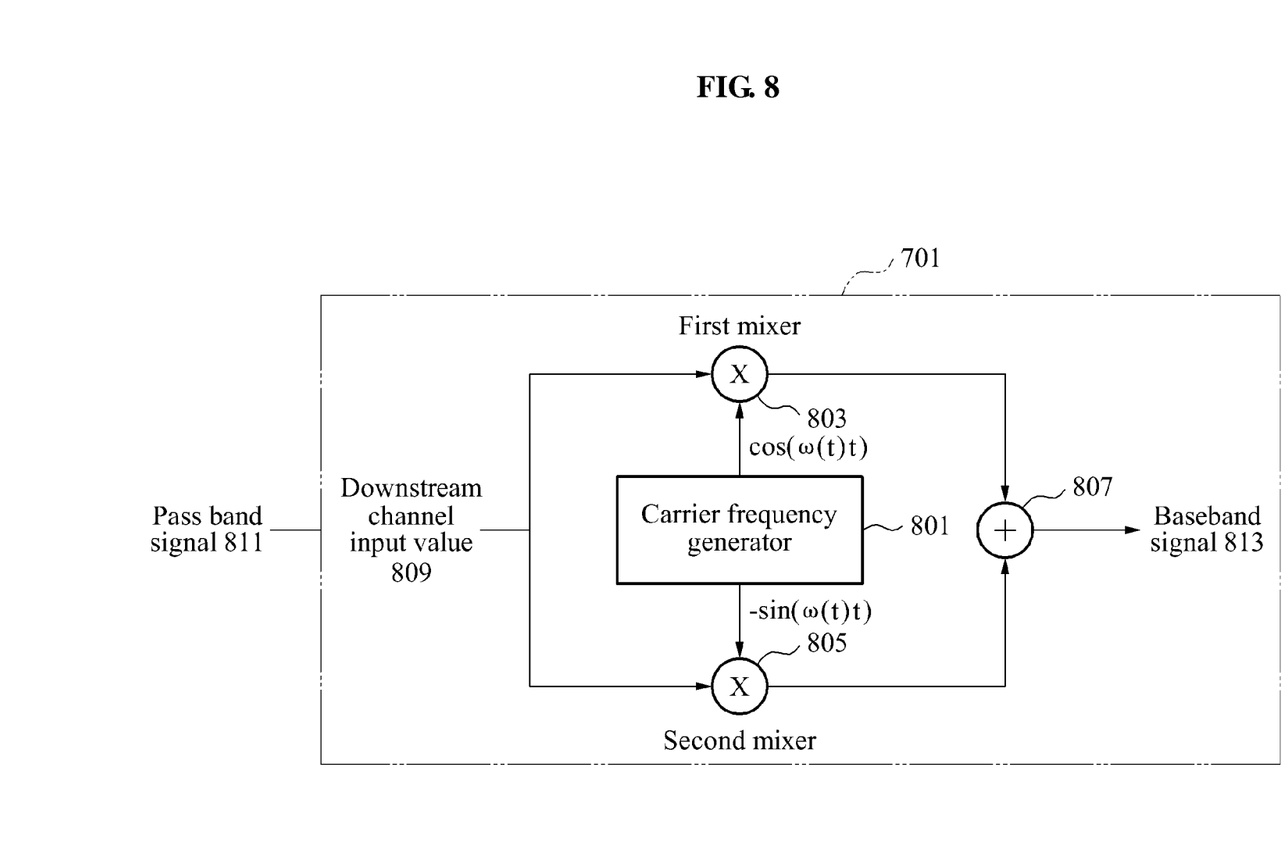
FIG. 8 is a diagram illustrating a configuration of a variable frequency down-converter included in a radar receiver.

FIG. 8 is a diagram illustrating a configuration of a variable frequency down-converter 701 included in a radar receiver.

Referring to FIG. 8, the variable frequency down-converter 701 may include a carrier frequency generator 801, a first mixer 803, a second mixer 805, and an operator 807.

The carrier frequency generator 801 may generate a carrier frequency based on an input downstream channel input value 809, for example, a channel number corresponding to a signal desired to be frequency down-converted.

The first mixer 803 may mix, for example, a pass band signal 811 and a signal (cos(ω(t)t)) corresponding to the carrier frequency provided from the carrier frequency generator 801.

The second mixer 805 may mix, for example, the pass band signal 811 and a signal (−sin(ω(t)t)) corresponding to the carrier frequency provided from the carrier frequency generator 801.

The operator 807 may output a baseband signal 813 by adding up an output of the first mixer 803 and an output of the second mixer 805.

Figure 9:
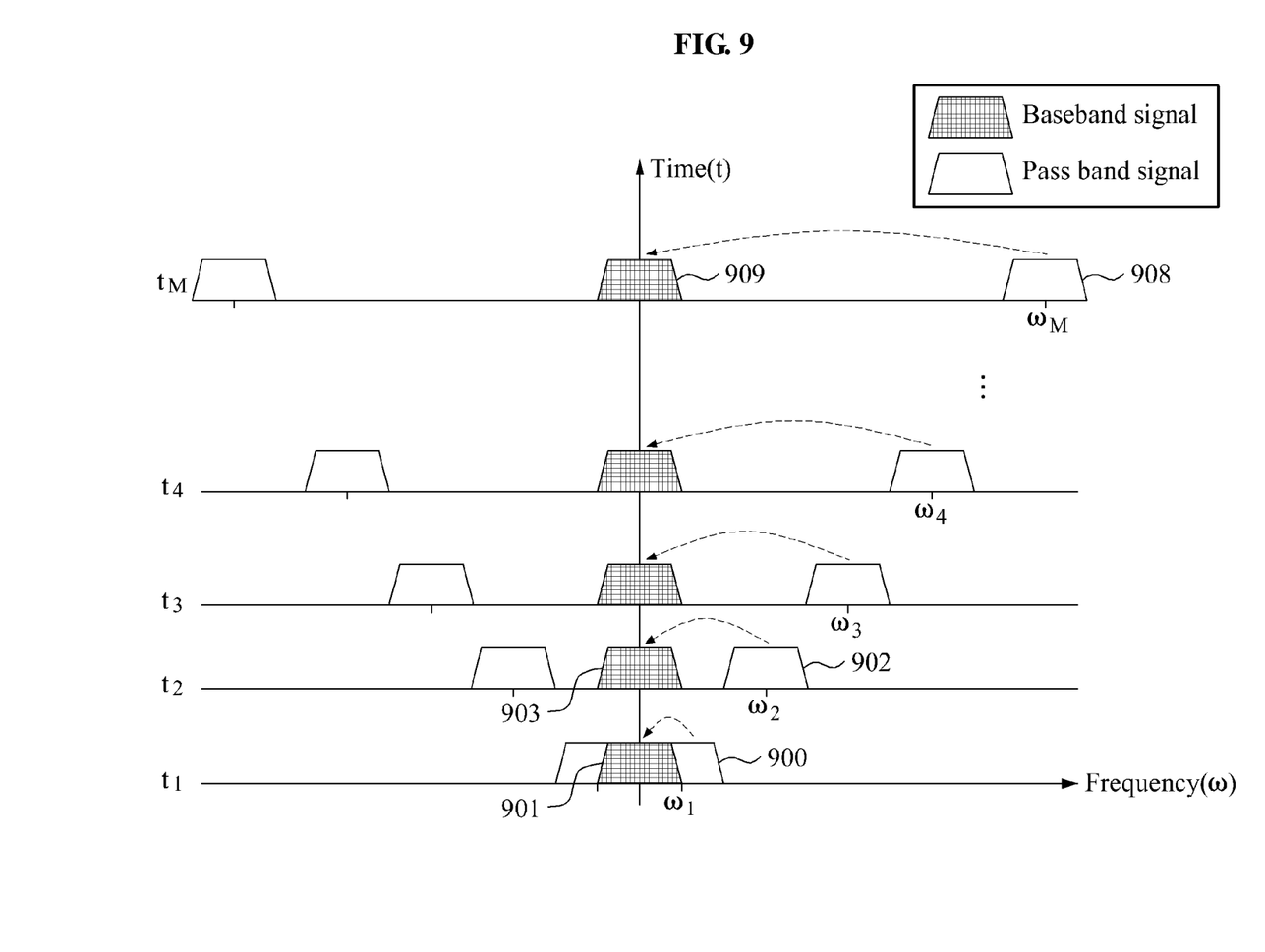
FIG. 9 illustrates an example of a radar receiver receiving a reflected signal.

FIG. 9 illustrates an example of a radar receiver receiving a reflected signal.

Referring to FIG. 9, the radar receiver may down-convert, to a baseband channel signal 901, a pass band channel signal 900 having a carrier frequency $\omega_1$ during a period of time from $T_1$ to $T_2$.

The radar receiver may down-convert, to a baseband channel signal 903, a pass band channel signal 902 having a carrier frequency $\omega_2$ during a period of time $T_2$ to $T_3$.

Also, the radar receiver may down-convert, to a base band channel signal 909, a pass band channel signal 908 having a carrier frequency $\omega_M$ during a period of time from $T_M$ to $T_{M+1}$.

Figure 10:
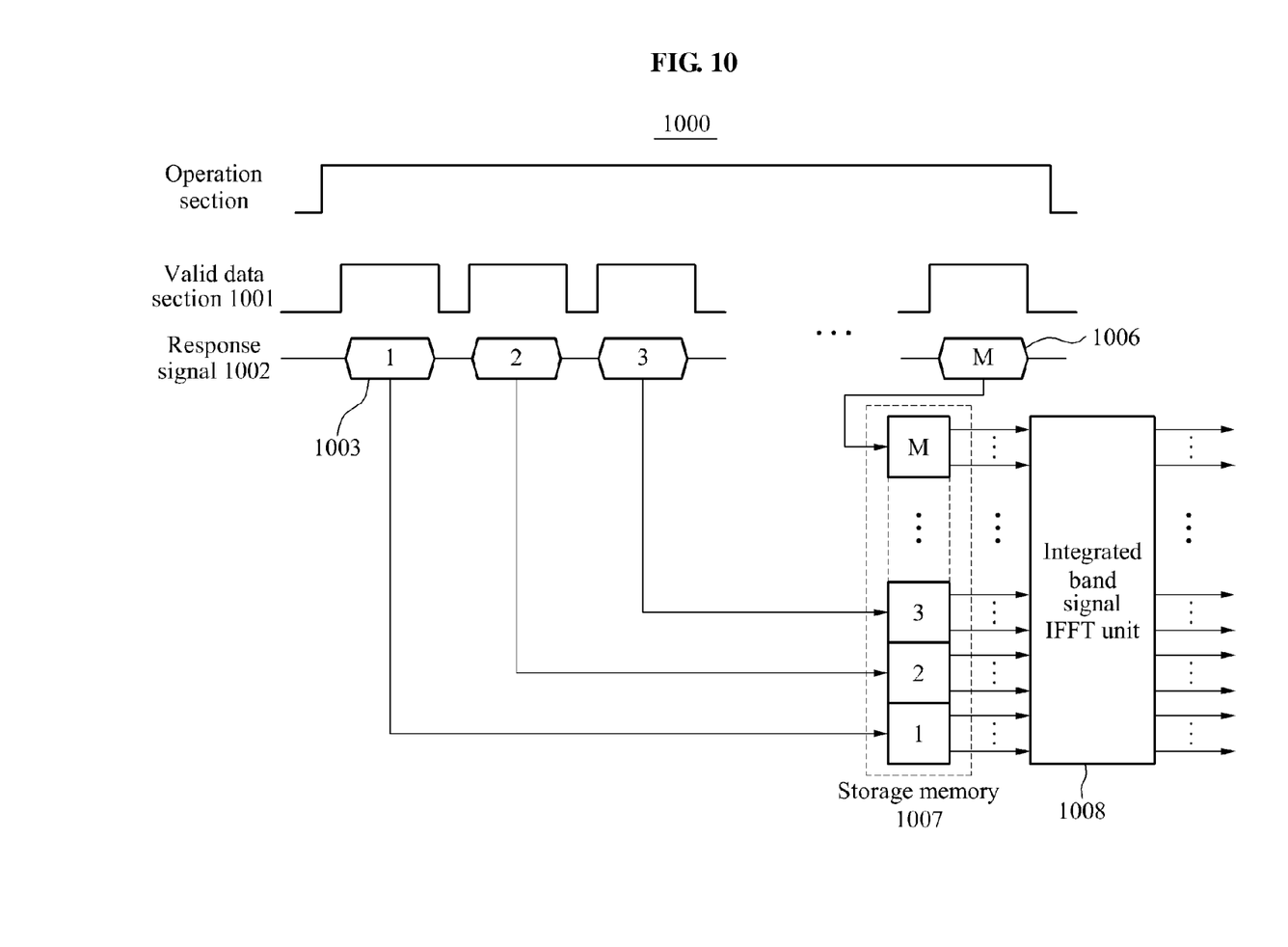
FIG. 10 is a diagram illustrating an operation method of a constructor included in a radar receiver.

FIG. 10 is a diagram illustrating an operation method of a constructor included in a radar receiver.

Referring to FIG. 10, the constructor may operate during a period 1000 in which an operation section control signal is generated.

The constructor may receive, from a channel estimator included in the radar receiver, baseband frequency domain response signals 1002 that are input within a valid data section control signal 1001, and may sequentially store the baseband frequency domain response signals 1002 in a storage memory 1007.

For example, the constructor may sequentially store, in the storage memory 1007, a baseband frequency domain response signal 1003 of a "number 1" channel to a baseband frequency domain response signal 1006 of a "number M" channel. When baseband frequency domain response signals of channels up to the "number M" channel are sequentially stored in the storage memory 1007, the constructor may configure an integrated band frequency domain response signal using M baseband frequency domain response signals.

The constructor may convert the integrated band frequency domain response signal to an integrated band time domain response signal using an integrated band signal IFFT unit 1008.

Figure 11:
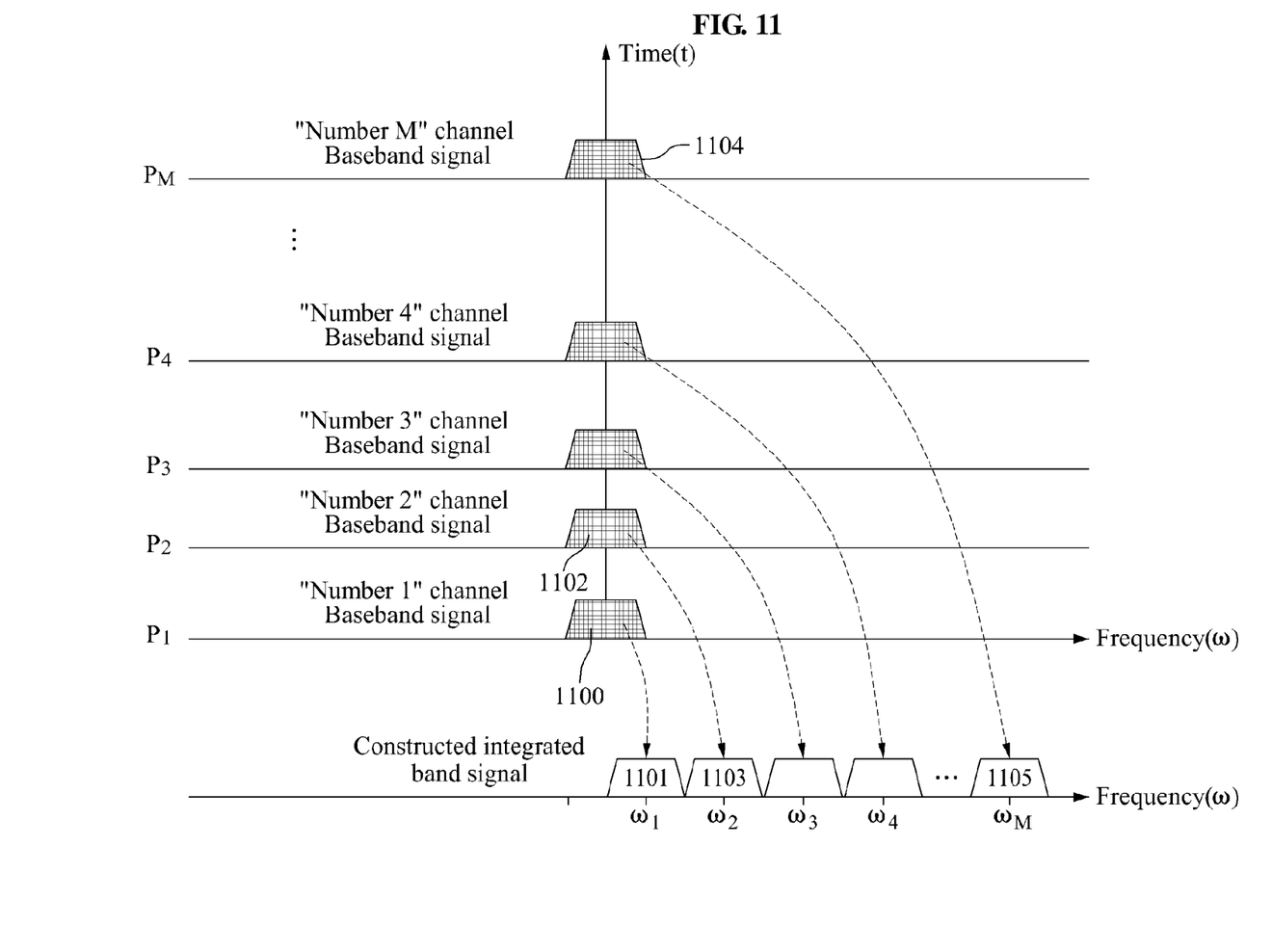
FIG. 11 illustrates an example of a radar receiver constituting an integrated band frequency band response signal.

FIG. 11 illustrates an example of a radar receiver constituting an integrated band frequency band response signal.

Referring to FIG. 11, the radar receiver may shift a frequency response of a baseband channel signal 1100 of a "number 1" channel, that is, a reflected signal, which is input in a time $P_1$, to the right by the number of subcarriers corresponding to a carrier frequency $\omega_1$ (1101). It may be configured by storing, in the storage memory 1007, the baseband frequency domain response signal 1003 of the "number 1" channel of FIG. 10 is stored in the storage memory.

The radar receiver may shift a frequency response of a baseband channel signal 1102 of a "number 2" channel, which is input in a time $P_2$, to the right by the number of subcarriers corresponding to a carrier frequency $\omega_2$ (1103). It may be configured by storing, in the storage memory 1007, a baseband frequency domain response signal of the "number 2" channel of FIG. 10.

The radar receiver may shift a frequency response of a baseband channel signal 1104 of a "number M" channel, which is input in a time $P_M$, to the right by the number of subcarriers corresponding to a carrier frequency $\omega_M$ (1105). It may be configured by storing, in the storage memory 1007, a baseband frequency domain response signal of the "number M" channel.

Figure 12:
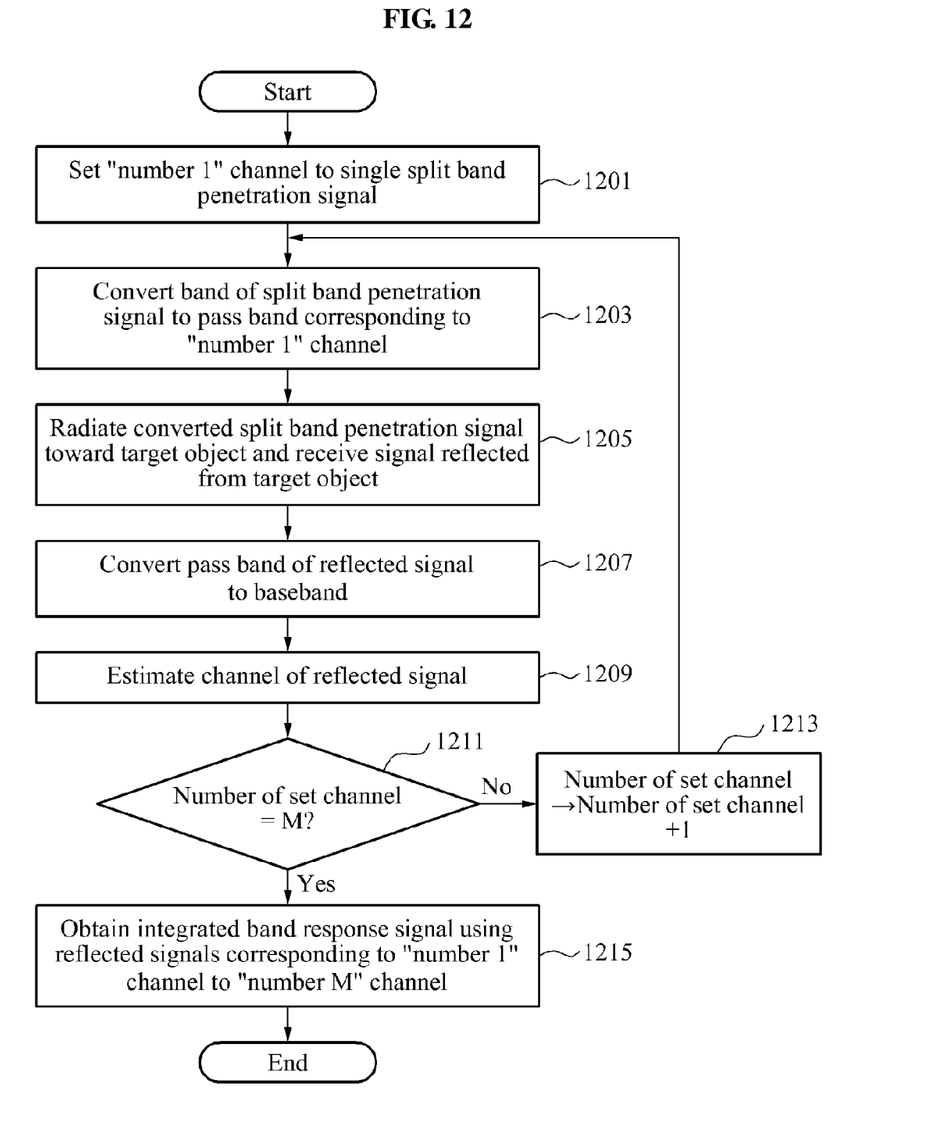
FIG. 12 is a flowchart illustrating a method of obtaining a radar signal according to an embodiment of the present invention.

FIG. 12 is a flowchart illustrating a method of obtaining a radar signal according to an embodiment of the present invention. Here, a radar signal obtainment apparatus according to an embodiment of the present invention may radiate a plurality of split band penetration signals toward a target object, may receive a plurality of signals reflected from the target object, and may obtain a wideband response signal using the plurality of reflected signals. Here, the radar signal obtainment apparatus may receive setting information including at least one of the number of channels corresponding to the number of the plurality of split band penetration signals, a channel bandwidth of each split band penetration signal, the number of subcarriers per channel, BPSK training data, and a transmission command signal, may generate the plurality of split band penetration signals based on the received setting information, and may radiate the generated plurality of split band penetration signals.

Referring to FIG. 12, the radar signal obtainment apparatus may set a "number 1" channel to a single OFDM-based split band penetration signal in operation 1201.

In operation 1203, the radar signal obtainment apparatus may convert a baseband of the split band penetration signal to a pass band corresponding to the set channel. Here, the radar signal obtainment apparatus may convert a band of each of the plurality of split band penetration signals to a different pass band by converting the band of each of the plurality of split band penetrations to a pass band corresponding to each set channel. For example, the radar signal obtainment apparatus may convert the band of each of the plurality of split band penetration signals to the pass band by performing up-converting by a carrier frequency corresponding to a corresponding channel.

In operation 1205, the radar signal obtainment apparatus may radiate the converted split band penetration signals toward a target object, for example, the road facilities, and may receive OFDM-based signals that are reflected from the target object.

In operation 1207, the radar signal obtainment apparatus may convert a pass band of the reflected signal to a baseband.

In operation 1209, the radar signal obtainment apparatus may estimate a channel of the converted reflected signal, and may obtain a channel estimate value corresponding to the estimated channel.

In operation 1211, the radar signal obtainment apparatus may determine whether the set channel is M. Here, M denotes a natural number. When the set channel is not M as the determination result, the radar signal obtainment apparatus may increase a number of the channel and may set a channel with the increased "number" to another split band penetration signal in operation 1213 and then move to operation 1203. For example, when the number of the channel is "number 1", the number of the channel may be increased to "number 2" and the "number 2" channel may be set to the other split band penetration signal.

When the number of the set channel is "number M" in operation 1211, the radar signal obtainment apparatus may obtain an integrated band response signal corresponding to a wideband using reflected signals corresponding to the "number 1" channel to the "number M" channel. The radar signal obtainment apparatus may obtain the integrated band response signal corresponding to the wideband using channel estimate values of all of the reflected signals.

According to embodiments of the present invention, it is possible to radiate a plurality of OFDM based split band penetration signals toward a target object, and to quickly obtain a wideband response signal using a plurality of signals reflected from the target object.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for obtaining a radar signal, the apparatus comprising:
    a radar transmitter to radiate a plurality of split band penetration signals toward a target object; and
    a radar receiver to receive a plurality of signals reflected from the target object, and to obtain a wideband response signal using the plurality of reflected signals;
    wherein the radar transmitter sets a channel to each of the plurality of split band penetration signals, converts a band of each of the plurality of split band penetration signals to a different pass band corresponding to the set channel, and radiates each of the plurality of split band penetration signals; and
    wherein the radar transmitter converts the band of each of the plurality of split band penetration signals to the pass band by up-converting the band of each of the plurality of split band penetration signals by a carrier frequency corresponding to the set channel.

2. The apparatus of claim 1, wherein the plurality of split band penetration signals and the plurality of reflected signals are based on an orthogonal frequency division multiplexing (OFDM) method.

3. The apparatus of claim 1, wherein the radar receiver converts a band of each of the plurality of reflected signals to a baseband, estimates a channel of the converted band of each of the plurality of reflected signals, obtains a channel estimate value corresponding to the estimated channel, and obtains the wideband response signal based on the obtained channel estimate values.

4. The apparatus of claim 1, wherein the radar transmitter receives setting information comprising at least one of the number of channels corresponding to the plurality of split band penetration signals, a channel bandwidth of each of the plurality of split band penetration signals, the number of subcarrier per channel, binary phase-shift keying (BPSK) training data, and a transmission command signal, generates the plurality of split band penetration signals based on the received setting information, and radiates the plurality of split band penetration signals.

5. The apparatus of claim 1, wherein the radar transmitter outputs a transmission synchronization signal to the radar receiver, and the radar receiver is synchronized with the radar transmitter using the transmission synchronization signal.

6. A method of obtaining a radar signal, the method comprising:
   radiating a plurality of split band penetration signals toward a target object; and
   receiving a plurality of signals reflected from the target object, and obtaining a wideband response signal using the plurality of reflected signals;
   wherein the radiating comprises:
   setting a channel to each of the plurality of split band penetration signals; and
   converting a band of each of the plurality of split band penetration signals to a different pass band corresponding to the set channel, and radiating each of the plurality of split band penetration signals; and
   wherein the converting and the radiating comprises converting the band of each of the plurality of split band penetration signals to the pass band by up-converting the band of each of the plurality of split band penetration signals by a carrier frequency corresponding to the set channel.

7. The method of claim 6, wherein the plurality of split band penetration signals and the plurality of reflected signals are based on an orthogonal frequency division multiplexing (OFDM) method.

8. The method of claim 6, wherein the obtaining comprises converting a band of each of the plurality of reflected signals to a baseband, estimating a channel of the converted band of each of the plurality of reflected signals, obtaining a channel estimate value corresponding to the estimated channel, and obtaining the wideband response signal based on the obtained channel estimate value.

9. The method of claim 6, wherein the radiating comprises:
   receiving setting information comprising at least one of the number of channels corresponding to the plurality of split band penetration signals, a channel bandwidth of each of the plurality of split band penetration signals, the number of subcarrier per channel, binary phase-shift keying (BPSK) training data, and a transmission command signal; and
   generating the plurality of split band penetration signals based on the received setting information, and radiating the plurality of split band penetration signals.

* * * * *